United States Patent
Schneider et al.

(10) Patent No.: US 6,694,277 B2
(45) Date of Patent: Feb. 17, 2004

(54) METHOD AND DEVICE FOR DETERMINING A MISALIGNMENT OF THE RADIATION CHARACTERISTIC OF A SENSOR FOR ADJUSTING THE SPEED AND DISTANCE OF A MOTOR

(75) Inventors: Hans-Peter Schneider, Stuttgart (DE); Hermann Winner, Karlsruhe (DE); Ralph Lauxmann, Korntal-Muenchingen (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,853
(22) PCT Filed: Apr. 3, 2001
(86) PCT No.: PCT/DE01/01263
§ 371 (c)(1), (2), (4) Date: Apr. 11, 2002
(87) PCT Pub. No.: WO01/79879
PCT Pub. Date: Oct. 25, 2001

(65) Prior Publication Data
US 2002/0138223 A1 Sep. 26, 2002

(30) Foreign Application Priority Data
Apr. 17, 2000 (DE) .......................................... 100 19 182

(51) Int. Cl.$^7$ .............................................. G01S 13/00
(52) U.S. Cl. ........................ 702/104; 702/94; 702/183; 342/70; 342/72
(58) Field of Search ............................ 702/85, 90, 94, 702/97, 104, 183; 342/70, 72, 118, 141, 146; 701/96, 301

(56) References Cited

U.S. PATENT DOCUMENTS

| | | | |
|---|---|---|---|
| 5,495,254 A | | 2/1996 | Uemura et al. |
| 5,964,822 A | * | 10/1999 | Alland et al. ................. 701/301 |
| 6,026,353 A | * | 2/2000 | Winner ......................... 702/183 |
| 6,031,600 A | * | 2/2000 | Winner et al. ............. 356/3.01 |
| 6,476,760 B1 | * | 11/2002 | Winter et al. ............... 342/173 |

OTHER PUBLICATIONS

Patent Abstracts of Japan, vol. 1997, No. 04, Apr. 30, 1997.
Patent Abstracts of Japan, vol. 2000, No. 14, Mar. 5, 2001.

* cited by examiner

Primary Examiner—Bryan Bui
(74) Attorney, Agent, or Firm—Kenyon & Kenyon

(57) ABSTRACT

A device and a method are for monitoring misalignment of a distance sensor on a vehicle which represents a combination of two individual procedures. The two individual procedures are selected in such a way that one procedure has advantages in areas in which the other procedure functions disadvantageously, so that the weaknesses of one procedure may be compensated for by the strengths of the other procedure. Furthermore, with the aid of this combination, it may be decided with far greater certainty whether a misalignment is present which may be removed using suitable correcting measures, or whether an extreme misalignment is present, based on which the system must be switched off.

17 Claims, 4 Drawing Sheets

METHOD AND DEVICE FOR DETERMINING A MISALIGNMENT OF THE RADIATION CHARACTERISTIC OF A SENSOR FOR ADJUSTING THE SPEED AND DISTANCE OF A MOTOR

FIELD OF THE INVENTION

The present invention relates to a method and a device for detecting and/or correcting misalignment of a distance sensor on a vehicle.

BACKGROUND INFORMATION

Some methods and devices for recognizing misalignment have been known to have the function of being able to self-correct their sensor viewing zone.

German Published Patent Application No. 197 46 524 describes a compensation device for compensating for the installation tolerances of a distance sensor in a vehicle. This is done by having the evaluation electronics registering the object distances and the object angles of the detected objects. These data are averaged over a specifiably long time, and the thus ascertained object angle average is accepted as the new nominal directional angle of the preceding vehicle. Furthermore, a correcting angle is calculated from the difference of the nominal directional angle and the actual directional angle. The registered object angles are corrected with this difference angle.

European Published Patent Application No. 0 782 008 describes a device for calculating and correcting the deviation of the center axis of an obstacle recognition device on a vehicle and equipment for proximity-controlled cruise control based on a preceding vehicle. This system recognizes standing objects, and from the positional displacement of the standing object relative to the sensor in time, it calculates whether the standing object has a relative speed component which is orthogonal to the axis of symmetry of the sensor's viewing zone, also called the optical axis. In the case of an accurately adjusted sensor, a mean value generation in time of this lateral relative speed gives a value tending to zero. In the case of a sensor's viewing zone that is out of alignment, a value not equal to zero is obtained by the mean value generation in time, which, by its magnitude permits drawing a conclusion on the misalignment angle of the sensor. Using this method, a misalignment of the sensor can be recognized, and the sensor's misalignment can be corrected.

Both methods have a device and a method, respectively, for recognizing misalignment, and both methods correct, upon recognizing misalignment, in such a way that a correcting angle ascertained from the measured values is added to the measured object angle. The axis of symmetry of the sensor is tilted by calculation in such a way that it approximately coincides with the central axis of the vehicle.

SUMMARY

It is common to conventional methods and devices for recognizing misalignment of distance sensors that in specified travel situations they yield good results, and in other travel situations they yield results the errors of which cannot be neglected. Thus, advantageous and disadvantageous travel states exist for each system.

It is an object of the present invention to let two or more differently defined individual procedures for misalignment recognition proceed simultaneously in combination and monitor the travel state or operate a device which makes use of two or more individual procedures. These two individual procedures are developed in such a way that at least one procedure yields reliable values in each travel state. Thereby, the weakness of one procedure, namely that it yields unreliable values in this travel state, is compensated for by the strength of another method, since the latter yields reliable values in this travel state. For the evaluation of the results of the individual procedures, a quality factor is developed from the currently present travel state for each individual procedure, which are used for the weighting of the results of the individual procedures. A linked misalignment value may be determined, depending on the weighted results of the individual procedures, as well as the results of the value linkage, which is corrected as a function of these values, or as a result of which the system is switched off for safety reasons. Defects in the sensor hardware become apparent from error images which may be represented by special misalignment vectors. Such a misalignment vector is made up of a linear combination of the misalignment values of the individual procedures. By monitoring the up-to-date-misalignment vectors, some hardware functions of the sensor important to the operation may thus be monitored. The present invention is suitable for horizontal and also for vertical misalignment recognition and/or misalignment correction. In case a vertical misalignment recognition and/or correction is to be performed, the sensor may also be in a position to measure the elevation angle of reflecting objects.

If a travel situation occurs in which an individual procedure used yields unreliable measured values, the results of this procedure are weighted more lightly at this point in time than another individual procedure which is expected to yield more reliable values in this travel situation, with the aid of a quality factor. By such a combination of individual procedures, it is possible to compensate for the weak points of one procedure by the strength of another procedure. It is also possible to predict with greater probability, from a measured sensor misalignment, that there is misalignment. If both procedures determine that there is misalignment, but in different angular directions, this may be caused by too large single procedure errors. If misalignment values appear in the same angular direction and at approximately equal angles from the vehicle's center axis, one may assume with greater probability than when only one individual procedure is used, that the sensor's axis has been shifted. In this case, one may make a reliable correction or switch off the system at smaller misalignment values than is possible using a individual procedure. In accordance with the present invention, operation of a proximity-controlled vehicle under cruise control is much safer than operating a vehicle having a sensor which is monitored by only one individual procedure for misalignment. Furthermore, the error due to disadvantageous surroundings is held much smaller than with an individual procedure, since at the time of measuring, the more reliable procedure is treated as more dominant because of the lower weighting of the unreliable result.

DETAILED DESCRIPTION

Figure 1:
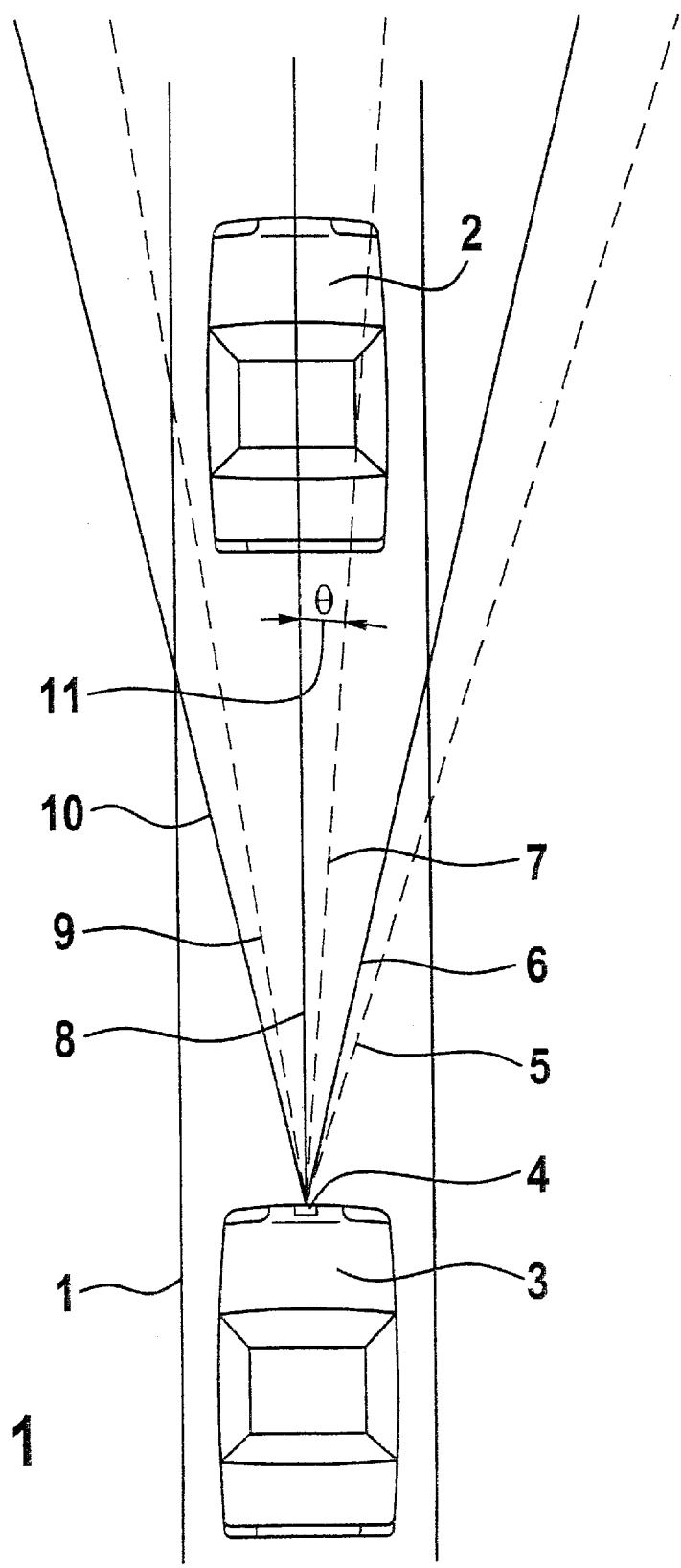
FIG. 1 is a top view of two vehicles traveling one behind the other in the same lane, the following vehicle being provided with a device according to the present invention.

FIG. 1 illustrates a lane 1, on which two vehicles 2 and 3 are traveling one behind the other, such that vehicle 3 follows vehicle 2. Vehicle 3 is equipped with a sensor 4 for speed control and proximity-controlled cruise control, which includes the present invention. Ray 8 represents the center axis of vehicle 3, which, in the case of an accurately adjusted sensor, is identical with the axis of symmetry of the sensor's viewing zone 7. This is also the principal beam direction of the sensor's radiation characteristic. Rays 6 and 10 represent the right and left edges, respectively, of the sector-shaped sensor viewing zone, ray 8 being exactly the bisector of the two rays 6 and 10. The lines marking an accurately adjusted sensor region (6, 8, 10) are indicated in FIG. 1 by solid lines. In the case of a horizontally misaligned sensor, i.e., the misalignment of the radiation characteristic was ascertained as being not equal to zero, the sensor's viewing zone is illustrated by broken lines 5, 7 and 9. These rays differ from rays 6, 8 and 10 only in that they are rotated by the horizontal misalignment angle theta, as illustrated in FIG. 1. In this regard, ray 5 represents the right edge of the sensor's viewing zone and ray 9 represents the left edge of the sensor's viewing zone. Ray 7 is the bisector between rays 5 and 9, and thus the center axis of the sector-shaped viewing zone of the sensor. Angle theta 11 indicates the sensor misalignment rotation. This angle may be measured between the motor vehicle's center axis and the axis of symmetry of the sensor's viewing zone. Inside the viewing zone of the sensor, an electromagnetic wave is emitted, e.g., a radar or LIDAR signal. Objects present in this viewing zone of the sensor scatter back a reflected wave which is detected at the sensor with the corresponding propagation delay. The angle at which a reflected signal is radiated and received is designated as the object angle, and is processed further as object angle value. All objects within the sensor's viewing zone are known by object distance and object angle. From these objects, a target object is selected. The object being selected may closest in distance and closest to the vicinity of the longitudinal axis of the vehicle.

Figure 2:
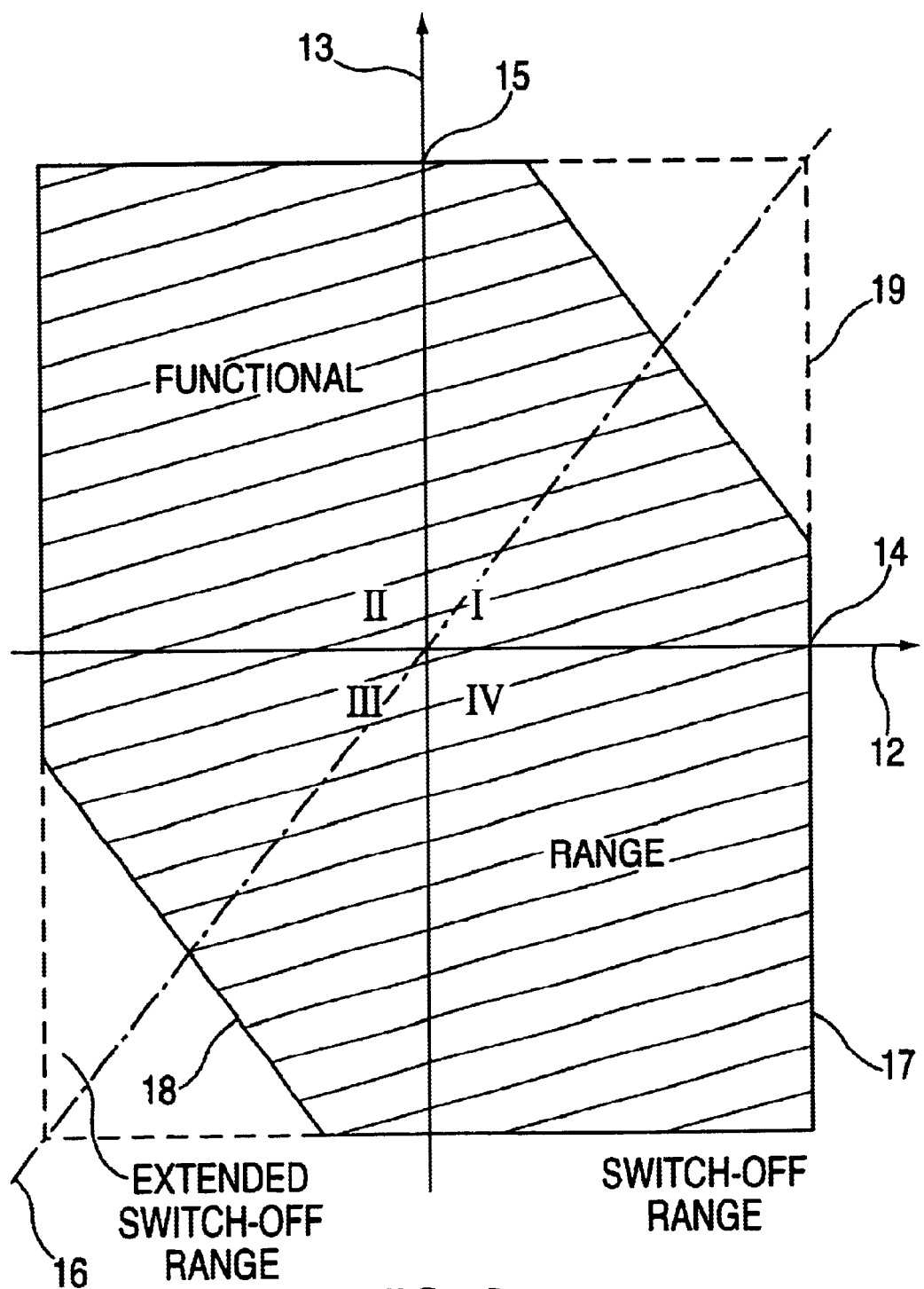
FIG. 2 is a diagram illustrating the shutoff range of the system as a function of the two orthogonal individual procedures.

FIG. 2 is a two-dimensional diagram illustrating the switch-off range as well as the functional range. The two coordinate axes 12 and 13 form an orthogonal system. The instantaneous misalignment value of one of the two individual procedures is plotted on each axis, whereby the misalignment value combination of the instantaneous individual misalignment values may be represented by a point in two-dimensional error space. In this example embodiment, the normalized error of the long-term filtering of the target object's course displacement is plotted on coordinate axis 12. The normalization occurs in such a way that the maximum tolerable error d_alpha_obj_max of this method is marked by point 14. Analogously, the normalized misalignment value of the regression analysis of trajectories is plotted on coordinate axis 13. Normalization occurs in the same manner, so that the maximum tolerable misalignment value of this method, d_alpha_traj_max is marked by point 15. If both methods for misalignment recognition are evaluated separately from each other, the evaluations yield a rectangle the center of which corresponds to the coordinate's origin. If the instantaneous misalignment point is inside this rectangle, this indicates that both single errors simultaneously are below each of their limiting values. One may then assume that the misalignment values arise through non-optimal travel situations, and the sensor's viewing zone may be readjusted. One may combine both methods with each other. If both methods indicate errors having the same sign, this indicates that the error points are in quadrants I or III, and if possibly they also lie near straight line 16, then both methods detect approximately the same misalignment value, and, with greater probability than with the use of one individual procedure, one may assume actual determination of the radiation characteristic compared to the vehicle's longitudinal axis. Because of this, in these areas, that is, in quadrants I and III, one may limit the functional region by removing a part of the functional region. This region, which now belongs to the switching off region, is thus called "broadened switching off region".

It should be noted that the borders between functional region and switching off region 17, as well as between functional region and broadened switching off region 18, as well as between switching off region and broadened switching off region 19 are illustrated in all four quadrants in FIG. 2 as straight lines, for simplicity, but in practice they may be shaped as any desired curves.

One may introduce further "broadened switching off regions", so as to be able to model the border of the functional region or the functional regions, as the case may be, as desired.

Figure 3:
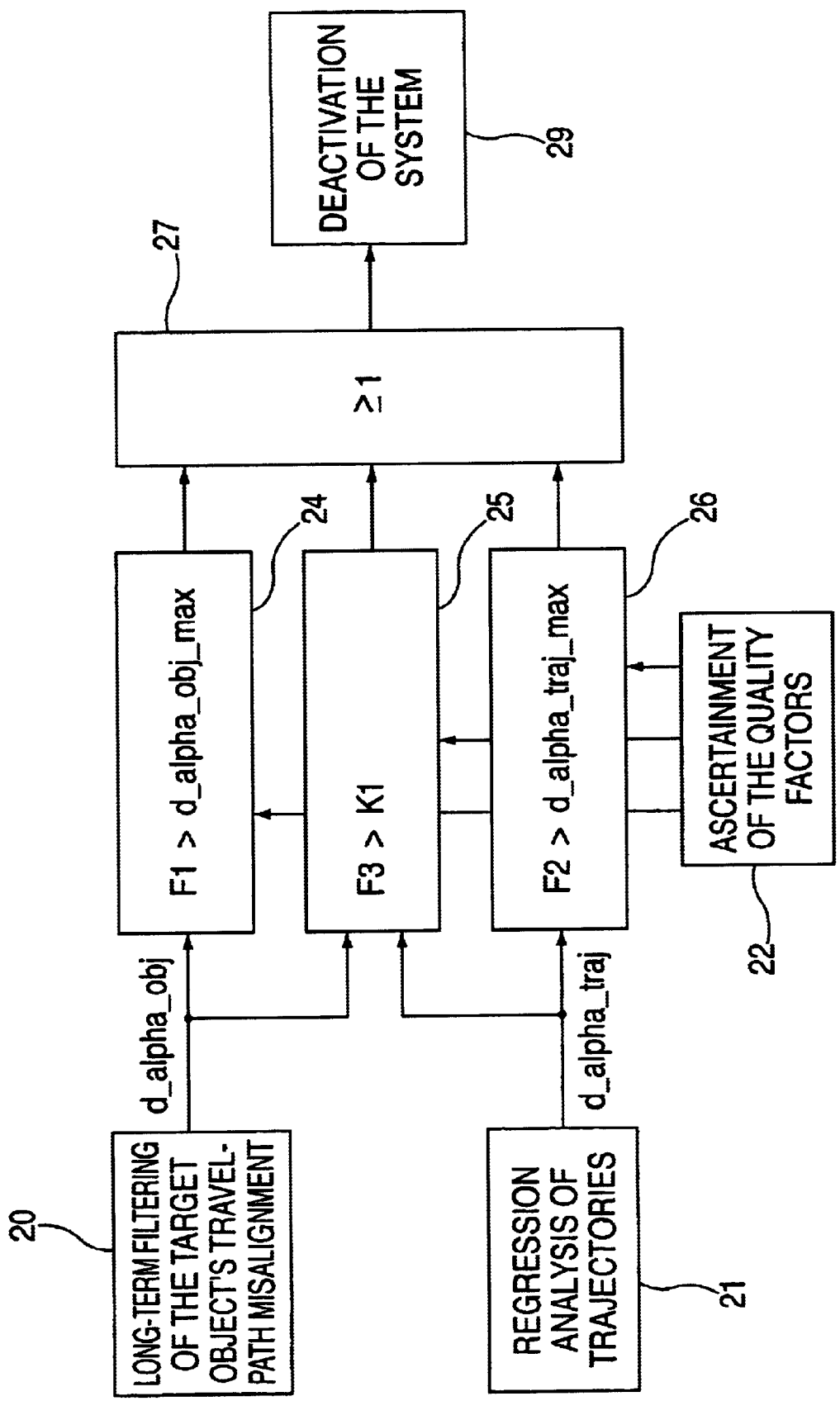
FIG. 3 is a block diagram of an example embodiment according to the present invention.

The functional manner of this combination method is illustrated in FIG. 3. The two single procedures "long-term filtering of the target object's travel-path misalignment" 20 as well as "regression analysis of trajectories" 21 calculate in each case an instantaneous misalignment value d_alpha_obj or d_alpha_traj. These two values are passed on to function blocks 24, 25 and 26, as in FIG. 3.

The travel situation is simultaneously ascertained from measured travel dynamics of other systems and/or additional vehicle data. In this connection, it is determined whether the vehicle is traveling straight ahead or along a curve, whether it is going upwardly or downwardly, or whether further conditions impairing the measuring procedures are fulfilled, e.g., in that a yaw rate signal, a pitch signal or additional signals describing travel dynamics are used. From the ascertained travel situation, a quality factor is calculated for each procedure in function block 22. The quality factor for the long-term filtering of the target object travel path displacement is passed on as q_obj, and the quality factor for the regression analysis of trajectories is passed on as q_traj. These quality factors are passed on to blocks 24, 25 and 26 in such a way that block 25 receives both quality factors q_obj and q_traj, block 24 only receives q_obj and block 26 only receives q_traj. In block 25, the broadened switching off region is now formed using the function $$F3(d\_alpha\_obj, q\_obj, d\_alpha\_traj, q\_traj) > \ldots K1(d\_alpha\_obj\_max, \_alpha\_traj\_max)$$

the two misalignment values d_alpha_obj and d_alpha_traj being weighted with the aid of quality factors q_obj and q_traj. If this equation is satisfied, then a greater error is present than is permissible, and a switching off request is passed on to block 27.

In block 24, using single misalignment value d_alpha_obj and the respective quality factor q_obj, a test is made whether $$F1(d\_alpha\_obj, q\_obj) > q\_alpha\_obj\_max$$

is satisfied. If yes, the error is greater than is permissible, and the switching off request is passed on to block 27. In block 26, using single misalignment value d_alpha_traj and the respective quality factor q_traj, a test is made whether the condition $$F2(d\_alpha\_traj, q\_traj) > q\_alpha\_traj\_max$$

is satisfied. If yes, the error is greater than is permissible, and the switching off request is passed on to block 27. If block 27 receives at least one switching off request from one of blocks 24, 25 or 26, it is passed on to block 29 that the proximity-control system and the cruise control may be switched off.

Figure 4:
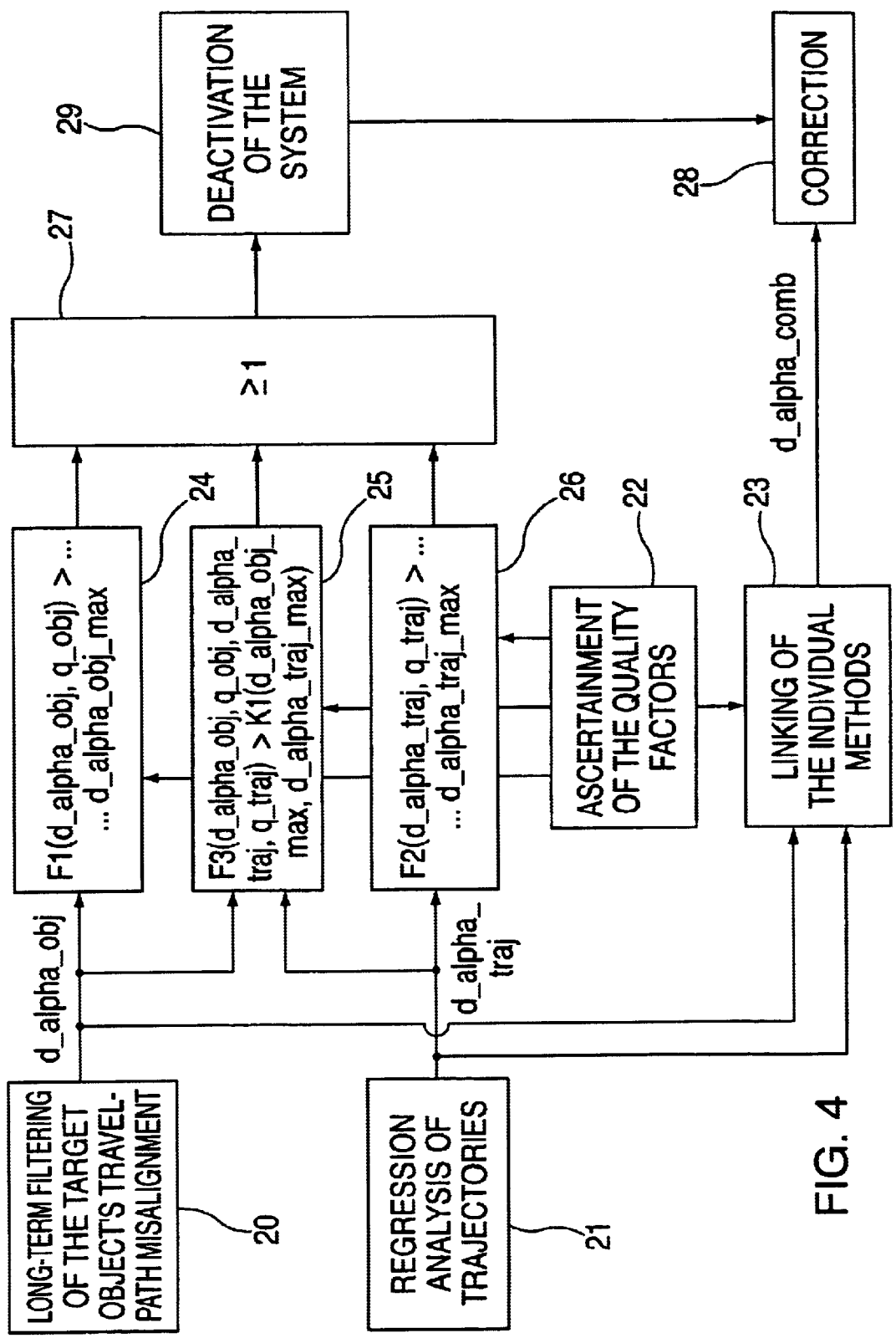
FIG. 4 is a block diagram of a second example embodiment according to the present invention.

In FIG. 4 a further example embodiment of the present invention is illustrated. This example embodiment includes all the parts described in FIG. 3, but with additional supplementations. Block 24 has been added. Block 23 receives the two single misalignment values d_alpha_obj and d_alpha_traj as well as the pertaining quality factors q_obj and q_traj. In block 23, a linked misalignment value d_alpha_comb is formed from these values, using the single misalignment values. The value thus created, d_alpha_comb is then passed on to likewise newly added block 28 where correction of the main radiation direction of the radiation characteristic is performed. If function block 28 is informed of a request to switch off, it causes deactivation of the correction and also deactivates the entire proximity-control system and cruise control system.

The values d_alpha_obj_max as well as d_alpha_traj_max may be constant values, but they may also be functions as illustrated in FIG. 2 as arbitrary straight lines, or they may look like arbitrarily shaped curves.

A plurality of variants are possible during system deactivation. Thus switching off the vehicle control may be kept up only so long as misalignment values are in a correctable region, that is, that block 27 receives at least one switching off request, or it may be switched off until the vehicle is started the next time and a negative self-diagnosis has been performed, or again, deactivation is kept up until this error message, which is stored in a nonvolatile memory, is reset in a garage.

The correction of the sensor's viewing zone may also be made in a different manner. One possibility is to add the determined linked misalignment angle value to all measured angle values, so that the new sensor viewing zone is tilted by calculation into the correct position. Another possibility provides for displacing the edge of the sensor viewing zone, which is on the side in the direction of which the axis of symmetry of the viewing zone has been displaced toward the center, until the axis of symmetry of the sensor's viewing zone is identical to the vehicle's center axis. This may have the disadvantage that the sensor's viewing zone becomes less at each correction, and after some operating period no longer exists.

In addition to monitoring the sensor adjustment, one may also monitor the sensor hardware. With certain combinations of the single misalignment values (d_alpha_obj; d_alpha_traj) one may conclude, on account of experiences gathered, that there are special defects in the sensor's hardware. If these combinations arise, the regulating system must be switched off due to possible hardware defects.

By linking a plurality of procedures, it is possible on the one hand to determine with greater probability that the ascertained correction value corresponds to the actual sensor malposition than when using a single procedure, whereby a robust monitoring procedure is ensured, and furthermore it is also possible to monitor parts of the sensor hardware for their functioning.

What is claimed is:

1. A method for ascertaining an alignment error of a radiation characteristic of a sensor for a cruise control and a proximity control system of a vehicle with respect to a vehicle longitudinal axis, comprising the steps of:

ascertaining the alignment error in accordance with at least two differently defined single procedures;

linking single misalignment values of the single procedures with each other to form a linked misalignment value; and switching off the cruise control and proximity control system when one of the following conditions is satisfied:

a first value, which is determined from the single misalignment values and quality factors, is greater than a first limiting value, wherein each of the quality factors corresponds to one of the single misalignment values, and one of the single misalignment values of the single procedures is greater than a second limiting value, wherein the one of the single misalignment values is weighted by a quality factor.

2. The method according to claim 1, further comprising the steps of:

recording an instantaneously present travel state; and ascertaining the linked misalignment value in accordance with the instantaneously present travel state.

3. The method according to claim 2, wherein the linked misalignment value ascertaining step includes the substep of weighting the misalignment values of the single procedures using quality factors formed from the instantaneous travel state.

4. The method according to claim 1, wherein a first one of the single procedures is configured so that a misalignment value is ascertained on the basis of a mean value generation in time via an instantaneous target object angle to a vehicle center axis; and wherein a second one of the single procedures is configured so that a further misalignment value is ascertained using a trajectories method, the trajectories method including the substeps of:

recognizing a relative change in an object position in accordance with a vehicle speed; and ascertaining a lateral relative speed of the object with respect to the vehicle center axis in accordance with the relative change of the object position.

5. The method according to claim 4, wherein the object includes a standing backscattering object.

6. The method according to claim 1, further comprising the step of continuously correcting the radiation characteristic of the sensor with respect to the vehicle longitudinal axis by the linked misalignment value.

7. The method according to claim 1, further comprising the steps of:

deactivating the cruise control and proximity control system when one of the limiting values is exceeded; and preventing reactivation of the cruise control and proximity control system until one of:

the misalignment values of the single procedures and the linked misalignment value are within a permissible error region;

an ignition of the vehicle is switched on again and a self-diagnosis without findings has been performed; and a deactivation state stored by the cruise control and proximity control system in a non-volatile manner is canceled.

8. The method according to claim 1, further comprising the step of continuously correcting a main propagation direction of the radiation characteristic by one of:

tilting the radiation characteristic by addition of the linked misalignment value to measured object angle values so that the main propagation direction coincides with the vehicle longitudinal axis; and displacing a lateral boundary of a sector-shaped radiation characteristic, in a direction of which the main propagation direction is displaced from the vehicle longitudinal axis toward a center until a sensor viewing zone is narrowed to be symmetrical with respect to the vehicle longitudinal axis.

9. The method according to claim 1, further comprising the step of inferring a special defect in the sensor hardware in accordance with certain combinations of at least one of the misalignment values of the single procedures and the quality factors.

10. The method according to claim 1, wherein the first limiting value is determined from a first predefined misalignment value and a first predefined quality factor value.

11. The method according to claim 1, wherein the second limiting value is determined from a second predefined misalignment value and a second predefined quality factor value.

12. The method according to claim 1, wherein the first limiting value is determined from a first predefined misalignment value and a first predefined quality factor value, and wherein the second limiting value is determined from a second predefined misalignment value and a second predefined quality factor value.

13. The method according to claim 1, wherein one of the single misalignment values is based on a travel path displacement, and another of the single misalignment values is based on a trajectory.

14. The method according to claim 1, wherein one of the single misalignment values is based on a travel path displacement.

15. The method according to claim 1, wherein one of the single misalignment values is based on a trajectory.

16. A device for ascertaining an alignment error of a radiation characteristic of a sensor for cruise control and proximity control of a vehicle with respect to a vehicle longitudinal axis, comprising:

an arrangement configured to ascertain the alignment error in accordance with at least two differently defined single procedures;

an arrangement configured to link misalignment values of the single procedures together to form a linked misalignment value;

an arrangement configured to switch off the cruise control and proximity control system as a function of the linked misalignment value; and an arrangement to record an instantaneously present travel state and to form therefrom quality factors, to link misalignment values of the single procedures, and to ascertain the linked misalignment value in accordance with the quality factors.

17. The device according to claim 16, wherein the arrangement to link misalignment values is operable to weight the misalignment values of the single procedures in accordance with the quality factors.

* * * * *

UNITED STATES PATENT AND TRADEMARK OFFICE
CERTIFICATE OF CORRECTION

PATENT NO. : 6,694,277 B2
DATED : February 17, 2004
INVENTOR(S) : Hans-Peter Schneider et al.

It is certified that error appears in the above-identified patent and that said Letters Patent is hereby corrected as shown below:

<u>Title page, Item [54] and Column 1, lines 1-5,</u>
Title, change "METHOD AND DEVICE FOR DETERMINING A MISALIGNMENT OF THE RADIATION CHARACTERISTIC OF A SENSOR FOR ADJUSTING THE SPEED AND DISTANCE OF A MOTOR" to -- METHOD AND DEVICE FOR DETERMINING A MISALIGNMENT OF THE RADIATION CHARACTERISTIC OF A SENSOR FOR ADJUSTING THE SPEED AND DISTANCE OF A MOTOR VEHICLE --.

Signed and Sealed this

Eighth Day of November, 2005

JON W. DUDAS
*Director of the United States Patent and Trademark Office*